United States Patent
Kawa et al.

(10) Patent No.: US 10,586,588 B1
(45) Date of Patent: Mar. 10, 2020

(54) REVERSING THE EFFECTS OF HOT CARRIER INJECTION AND BIAS THRESHOLD INSTABILITY IN SRAMS

(71) Applicant: Synopsys, Inc., Mountain View, CA (US)

(72) Inventors: Jamil Kawa, Campbell, CA (US); Thu V. Nguyen, San Jose, CA (US); Victor Moroz, Saratoga, CA (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 16/030,737

(22) Filed: Jul. 9, 2018

Related U.S. Application Data

(60) Provisional application No. 62/531,051, filed on Jul. 11, 2017.

(51) Int. Cl.
  *G11C 11/417* (2006.01)
  *H01L 27/11* (2006.01)
  *G06F 17/50* (2006.01)

(52) U.S. Cl.
  CPC ........ *G11C 11/417* (2013.01); *G06F 17/5045* (2013.01); *H01L 27/1104* (2013.01)

(58) Field of Classification Search
  CPC . G11C 11/417; G06F 17/5045; H01L 27/1104
  See application file for complete search history.

(56) References Cited

U.S. PATENT DOCUMENTS

| 8,670,281 B2 | 3/2014 | Joshi et al. | |
| 8,964,454 B1* | 2/2015 | Huang | G11C 11/412 |
| | | | 365/154 |
| 2006/0002223 A1* | 1/2006 | Song | G11C 11/417 |
| | | | 365/226 |
| 2010/0046276 A1 | 2/2010 | Chen et al. | |
| 2014/0003133 A1* | 1/2014 | Lin | G11C 11/419 |
| | | | 365/154 |
| 2017/0024003 A1* | 1/2017 | Kawa | G06F 1/3296 |

FOREIGN PATENT DOCUMENTS

EP   2509011 A1   10/2012

OTHER PUBLICATIONS

Lee et al., "Transient charging and relaxation in high-k gate dielectrics and their implications," Japanese journal of applied physics, 44(4S), pp. 2415-2419 (2005).

* cited by examiner

*Primary Examiner* — Khamdan N. Alrobaie
(74) *Attorney, Agent, or Firm* — Haynes Beffel & Wolfeld LLP

(57) ABSTRACT

The independent claims of this patent signify a concise description of embodiments. Disclosed is technology for detrapping charges in gate dielectrics in P-channel pull-up transistors and N-channel pull-down transistors in a portion of a static random access memory (SRAM) array due to hot carrier injection (HCI), negative bias temperature instability (NBTI) and positive bias instability (PBTI). This Abstract is not intended to limit the scope of the claims.

20 Claims, 10 Drawing Sheets

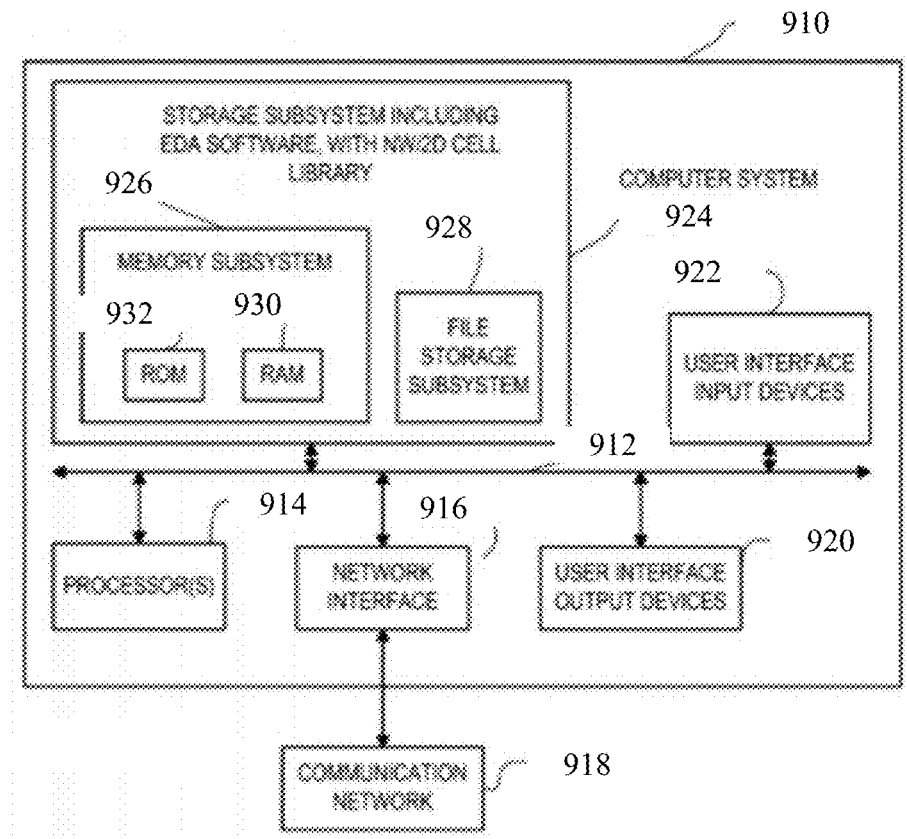
FIG. 9A
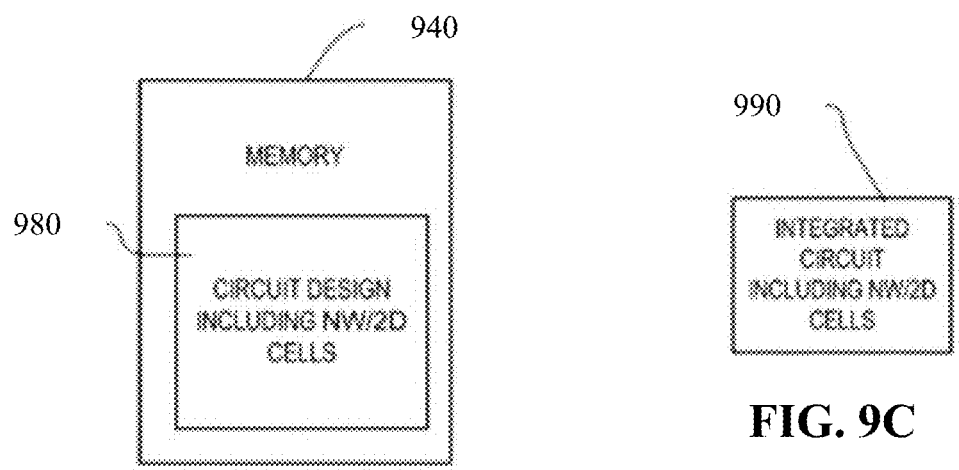
FIG. 9B
FIG. 9C

REVERSING THE EFFECTS OF HOT CARRIER INJECTION AND BIAS THRESHOLD INSTABILITY IN SRAMS

CROSS-REFERENCE TO RELATED APPLICATIONS

This application claims priority under 35 U.S.C. § 119(e) to U.S. Provisional Application No. 62/531,051 filed on Jul. 11, 2017, the entire contents of which are hereby incorporated by reference herein.

The following applications are also incorporated by reference herein for its teachings: U.S. application Ser. No. 13/929,076, filed on Jun. 27, 2013.

FIELD OF THE INVENTION

The invention relates to static random access memory (SRAM), and more particularly to an SRAM array and related technologies.

COPYRIGHT NOTICE

The assignee of this patent document has no objection to the facsimile reproduction by anyone of the patent document itself, or of the patent application, as it appears in the files of the United States Patent and Trademark Office, but otherwise reserves all rights whatsoever in any included works of authorship protected by copyright.

DISCLAIMER

In the following Background, Summary, and Detailed Description, headings should not be construed as necessarily limiting. In the following Background, Summary and Detailed Description, the citation or identification of any publication does not signify relevance or status as prior art for any of the claimed or described embodiments.

BACKGROUND

Static Random Access Memory (SRAM) is a critical component in most integrated circuit designs. A typical 6-transistor SRAM cell 100 circuit schematic is shown in FIG. 1. It is based on a pair of cross-connected inverters, and includes a first inverter made with a first P-channel pull-up transistor PU1 110 and a first N-channel pull-down transistor PD1 112, and a second inverter made with a second P-channel pull-up transistor PU2 114 and a second N-channel pull-down transistor PD2 116. The drain of transistor PU1 is connected to the drain of transistor PD1, and the drain of transistor PU2 is connected to the drain of transistor PD2. The sources of both transistors PU1 and PU2 are connected to a power source line Vdd 118 and the sources of both transistors PD1 and PD2 are connected to a reference line Vss 120. The gates of transistors PU1 and PD1 are connected together and to the node connecting the drain of PU2 with the drain of PD2. Similarly, the gates of transistors PU2 and PD2 are connected together and to the node connecting the drain of PU1 with the drain of PD1. The 'true' bit line BL is connected to the gates of transistors PU2 and PD2 through a first pass-gate transistor PG1, and the 'complement' bit line BLB is connected to the gates of transistors PU1 and PD1 through a second pass gate transistor PG2. As used herein, the terms "true" and "complement" bit lines are used as a convenience to mean opposite polarity bit lines of a differential pair. In a particular array, which bit line is considered "true" and which is considered "complement" depends on circuitry outside the array.

A typical write operation for the SRAM cell of FIG. 1 includes applying the value to be written to one of the bit lines and its complement to the other. The word line is then asserted and the bit line values override any value previously stored in the cell, and the cross-coupled inverters lock in the new value. The word line is then de-asserted.

A typical FinFET-based layout of the 6-transistor cell 100 is shown in FIG. 2. The layout diagram shows an N-channel diffusion 210, in which channel regions of transistors PG1 and PD1 are defined by gate electrodes 212 and 214, respectively. A gate electrode 214 defines the channel region of transistor PU1 in a P-channel diffusion 216. The gates electrodes 220 and 222 define the channel regions of transistors PD2 and PG2 in the N-channel diffusion 218 respectively. The gate electrode 220 defines the channel region of transistor PU2 in the P-channel diffusion 224. The diffusions 210, 216, 218 and 224 are formed in fins. A local metal interconnect 226 connects the gate electrode 220 to the junction between transistors PG1, PD1, and PU1, and a local interconnect 228 connects the gate electrode 214 to the junction between transistors PG2, PD2, and PU2. Higher level metal interconnects are not shown in FIG. 2, but connections to WL, BL, BLB, Vdd, and Vss are indicated. In general, unless otherwise stated, for clarity of illustration, such higher level interconnects are not shown in any of the layout drawings herein. As used herein, a "fin" is a segment of semiconductor ridge material which is physically spaced by dielectric materials (including air) from all other segments of semiconductor ridge material.

In general, "hot carriers" are particles that attain a very high kinetic energy from being accelerated by a high electric field in P-channel and N-channel transistors. These energetic carriers can be injected into normally forbidden regions of the device, such as the gate dielectrics of the transistors, where they can get trapped. These defects can then lead to threshold voltage shifts in the transistors and can be a major reliability concern in the performance of an SRAM cell.

With the introduction of high-k gate dielectrics in P-channel and N-channel transistors, bias temperature instability (BTI) is also another major reliability concern in SRAM cells. BTI happens when the gate of a heated transistor is heavily or nominally biased while keeping the source and drain grounded for n-channel transistors or when the gate of a heated transistor is grounded or negatively biased while keeping the source and drain at Vdd level. BTI may also happen in an analog circuit when the drain-source bias is non zero. Under these conditions, charges can get trapped in the gate dielectrics of the p-channel and n-channel transistors and degrade the threshold voltage of the transistors. A prominent form occurs when the gate of a p-channel transistor is biased negatively (in the strong inversion regime). This effect is known as the negative bias temperature instability (NBTI). When the gate is biased positively for N-channel devices, the phenomenon is called positive bias temperature instability (PBTI). As a consequence of BTI, the overall change of the threshold voltages of the transistors can increase the probability that the transistors fail to operate properly, which may yield a malfunctioning transistor (though not necessarily destroyed yet).

Aspects of the invention address the problem of trapped charges in gate dielectrics of P-channel pull-up transistors and N-channel pull-down transistors in an SRAM cell.

SUMMARY

The claims signify a brief description of one or more of the innovations, embodiments, and/or examples found within this disclosure.

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

Roughly described, a method is provided that may be used to detrap charges in gate dielectrics of P-channel pull-up transistors in a portion of an SRAM array in an integrated circuit. The SRAM array may comprise a plurality of SRAM cells arranged in rows and columns. Each SRAM cell may comprise a first inverter and a second inverter. Each inverter may comprise a P-channel pull-up transistor and an N-channel pull-down transistor. The P-channel pull-up transistor and the N-channel pull-down transistor may have their drains connected together and their source/drain paths connected in series between a power supply line and a reference line. Each SRAM cell further may comprise a plurality of pass-gate transistors including a first pass-gate transistor and a second pass-gate transistor. The first pass-gate transistor and the second pass-gate transistor may have gates connected to a word line. The first pass-gate transistor may also have a source/drain path connected to the first inverter, a bit line, and gates of the second inverter. The second pass-gate transistor may also have a source/drain path connected to the second inverter, a complement bit line, and gates of the first inverter. The integrated circuit may include a decoder/driver circuitry which in response to a trigger signal to detrap charges in gate dielectrics of P-channel pull-up transistors: (i) apply a high voltage to the power supply line; (ii) apply a low voltage to the word line; (iii) apply a first voltage to the bit line and a second voltage to the complement bit line; (iv) apply the high voltage to the word line; (v) lower the voltage at the power supply line to the low voltage; and (vi) maintain the voltages at the power supply line, the word line, the bit line and the complement bit line for a first period of time.

In some embodiments, the first period of time is in a range of 1 microseconds-300 seconds.

In some embodiments, the first voltage is the low voltage and the second voltage is the high voltage. In other embodiments, the first voltage is the high voltage and the second voltage is the low voltage.

In some embodiments, lowering the voltage at the power supply line to the low voltage further comprises increasing the voltage at the gates of the first inverter higher than a voltage at the source of the P-channel pull-up transistor of the first inverter. In some embodiments, lowering the voltage at the power supply line to the low voltage further comprises increasing the voltage at the gates of the second inverter higher than a voltage at the source of the P-channel pull-up transistor of the second inverter.

In some embodiments, the portion of the SRAM array comprises a member of the group consisting of: at least one SRAM cell in the SRAM array, a row of SRAM cells in the SRAM array, and every SRAM cell in the SRAM array.

In some embodiments, the P-channel pull-up transistors, the N-channel pull-down transistors, and the plurality of pass-gate transistors in the SRAM array are planar field effect transistors. In other embodiments, the P-channel pull-up transistors, the N-channel pull-down transistors, and the plurality of pass-gate transistors are Fin Field Effect Transistor transistors (FinFETs).

Another method is provided that may be used to detrap charges in gate dielectrics of N-channel pull-down transistors in a portion of the SRAM array in the integrated circuit. In response to a trigger signal to detrap charges in gate dielectrics of N-channel pull-down transistors, the decoder/driver circuitry of the integrated circuit may: (i) apply a low voltage to the power supply line; (ii) apply a high voltage to the word line; (iii) apply the low voltage to the bit line and the complement bit line; (iv) apply the low voltage to the word line; (v) apply the high voltage to the Vss reference line; and (vi) maintain the voltages at the power supply line, the word line, the bit line, the complement bit line and the reference line for a first period of time.

In some embodiments, the first period of time is in a range of 1 microsecond-300 seconds.

In some embodiments, the portion of the SRAM array comprises a member of the group consisting of: at least one SRAM cell in the SRAM array, a row of SRAM cells in the SRAM array, and every SRAM cell in the SRAM array.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification, and drawings.

These and other features, aspects, and advantages of the invention will become apparent from the following detailed description of illustrative embodiments thereof, which is to be read in connection with the accompanying drawings.

BRIEF DESCRIPTION OF THE DRAWINGS

The invention will be described with respect to specific embodiments thereof, and reference will be made to the drawings.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

FIGS. 9A, 9B, and 9C depict simplified block diagrams of a computer system suitable for use with embodiments of the technology, as well as circuit design and circuit embodiments of the technology.

In such various figures, reference signs may be omitted as is consistent with accepted engineering practice; however, one of ordinary skill in the art will understand that the illustrated components are readily understood when viewed in the context of the illustration as a whole and the accompanying disclosure describing such various figures.

DETAILED DESCRIPTION

The following Detailed Description, Figures, and Claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such Figures are not necessarily drawn to scale and are part of the Disclosure.

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to enable one or more of the exemplary innovations, embodiments and/or examples. In the interest of not obscuring the presentation of the exemplary innovations, embodiments and/or examples in the following Detailed Description, some processing steps or operations that are known in the art may be combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. Instead, the following description is focused on the distinctive features or elements of various exemplary innovations, embodiments and/or examples. Furthermore, while this description may refer to some components of the structure in the singular tense, more than one component may be depicted throughout the Figures and like components are labeled with like numerals.

Figure 3:
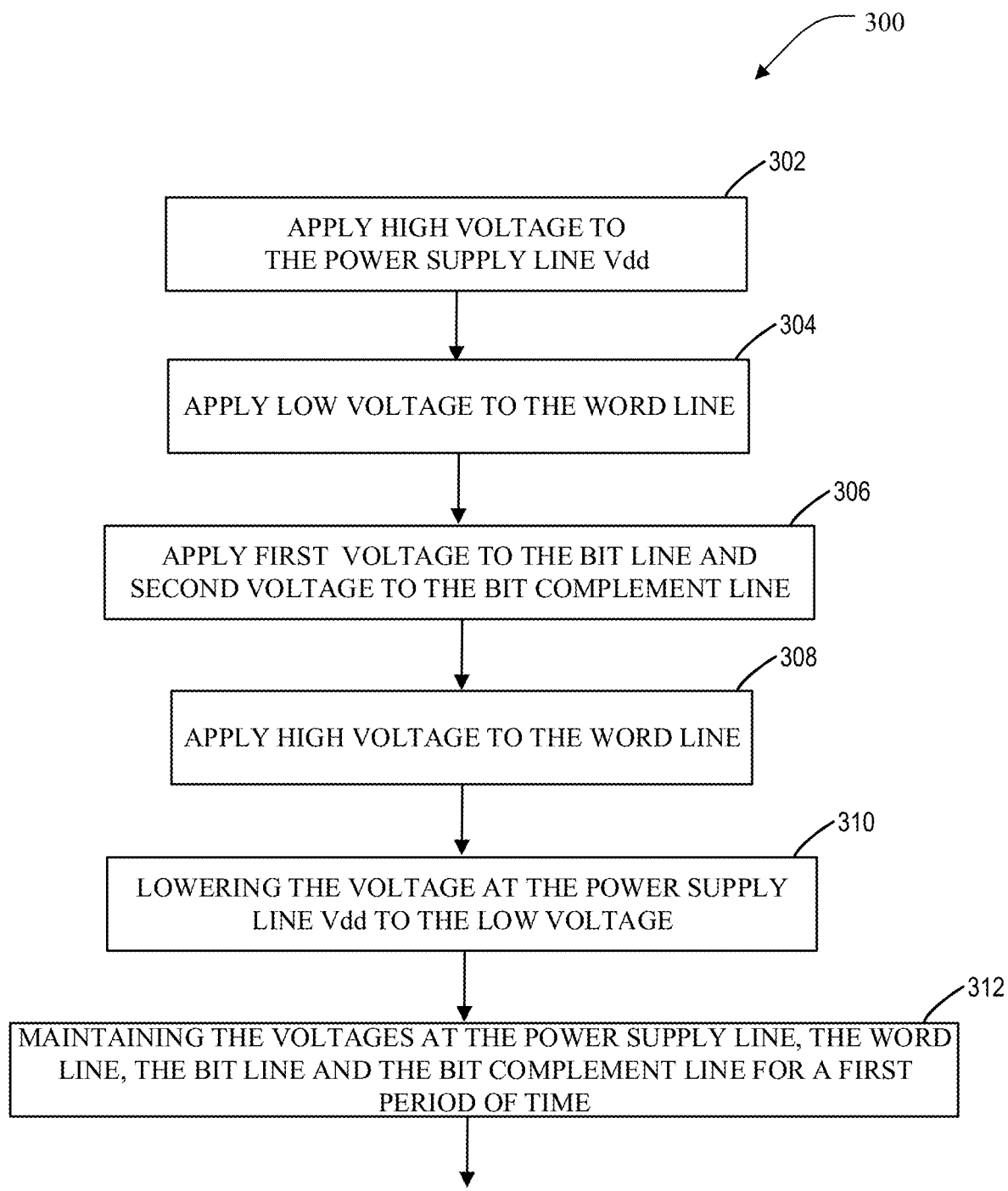
FIG. 3 illustrates an example method of detrapping charges in P-channel pull-up transistors in an SRAM cell.

FIG. 3 illustrates an example method of detrapping charges in P-channel pull-up transistors in an SRAM cell. For example, the method can be used to detrap charges in the gate dielectrics of the first P-channel pull-up transistor PU1 110 and the second P-channel pull-up transistor PU2 114 in the 6-transistor SRAM cell 100 in FIG. 1, after one or more data write operations having occurred on the cell. The SRAM cell in FIG. 1 has two pass-gate transistors, PG1 and PG2. However, in other embodiments, the SRAM cell may have more than two pass-gate transistors, such as an 8-transistor SRAM cell with four pass-gate transistors or a 10-transistor SRAM cell with six pass-gate transistors. In some embodiments, the transistors in the SRAM cell may be planar field effect transistors. In other embodiments, the transistors in the SRAM cell are FinFETs.

Figure 5:
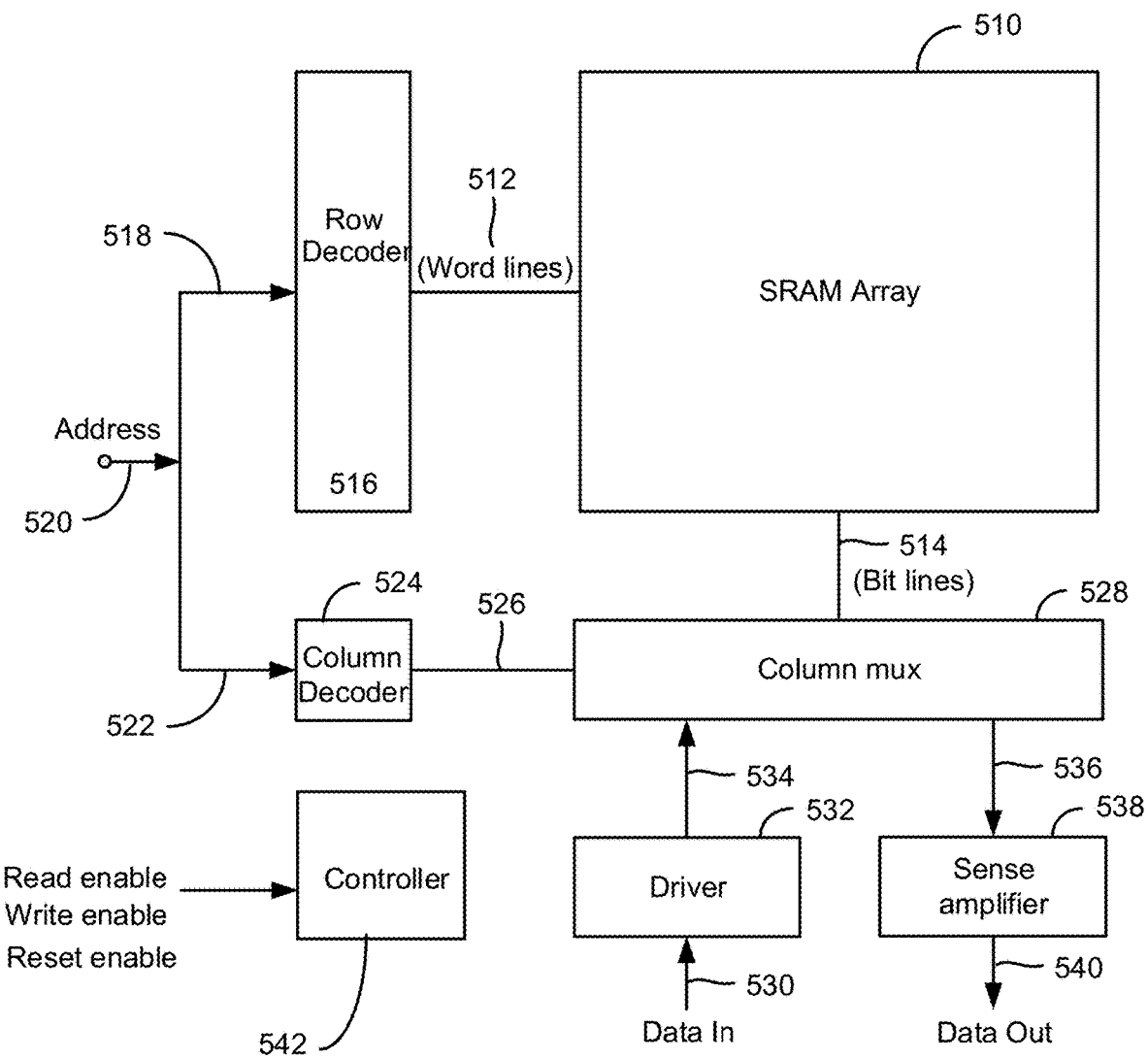
FIG. 5 is a block diagram of a typical SRAM array and decoder/driver circuitry, which may be a standalone SRAM device or part of a larger integrated circuit device and which may incorporate aspects of the invention.

Flowchart 300 can be performed at least partially with a controller, such as the controller in FIG. 5. Other implementations may perform the steps in different orders and/or with different, fewer or additional steps than those illustrated in FIG. 3. Multiple actions can be combined in some implementations. For convenience, this flowchart is described with reference to the SRAM cell 100 in FIG. 1. The SRAM cell is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as an SRAM array with planar transistors, an SRAM array with FinFETs, etc.

FIG. 3 includes a process 300 that begins at step 302, where a high voltage is applied to the power supply line Vdd 118. As described herein, a "high" voltage is the nominal positive power supply voltage dependent on the technology node with typical accepted tolerance. For 14 nm/16 nm FinFET, the nominal positive power supply is 1V with typical accepted tolerance of +/−20%.

Process 300 continues at step 304 where a low voltage is applied to the word line WL. As described herein, a "low" voltage may be negative power supply voltage or typically ground voltage.

At step 306, a first voltage is applied to the bit line BL and a second voltage is applied to the complement bit line BLB. In one embodiment, to detrap charges in the gate dielectric of the first P-channel pull-up transistor PU1 110 in FIG. 1, the first voltage can be the low voltage and the second voltage can be the high voltage. In another embodiment, to detrap charges in the gate dielectric of the second P-channel pull-up transistor PU2 114 in FIG. 1, the first voltage can be the high voltage and the second voltage can be the low voltage.

At step 308, a high voltage is applied to the word line WL.

At step 310 the voltage at the power supply line Vdd is lowered to the low voltage. In some embodiments, at step 310, the voltages at the gates of the first inverter and the gates of the second inverter is increased to a voltage higher than the high voltage.

At step 312, the voltages at the power supply line Vdd, the word line WL, the bit line BL and the complement bit line BLB are maintained for a period of time. In some embodiments, the period of time is at least 1 microsecond. In some embodiments, the period of time is in a range of 1 microsecond-300 seconds.

Figure 4:
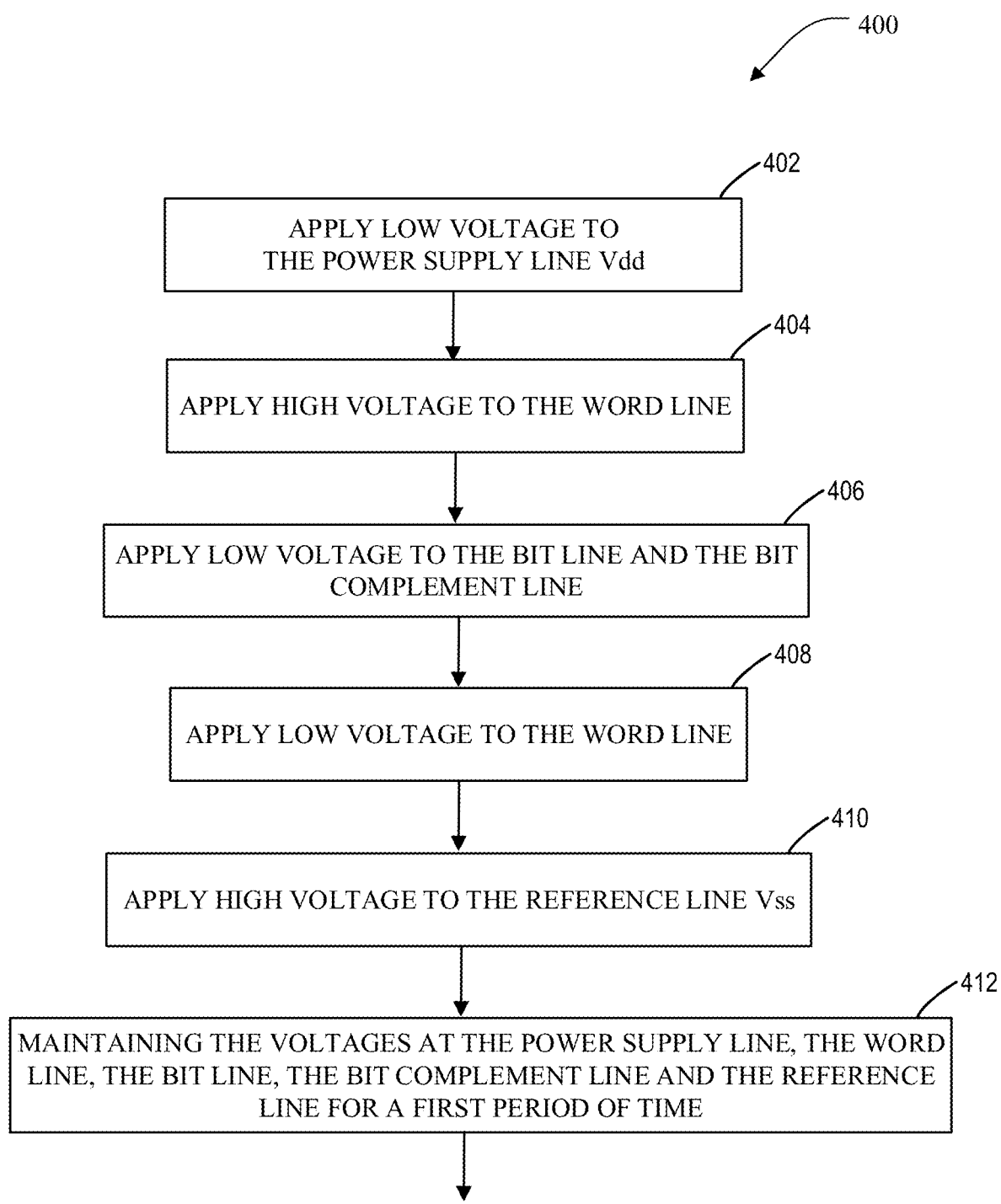
FIG. 4 illustrates an example method of detrapping charges in N-channel pull-down transistors in an SRAM cell.

FIG. 4 illustrates an example method of detrapping charges in N-channel pull-down transistors in an SRAM cell. For example, the method can be used to detrap charges in the gate dielectrics of the first N-channel pull-down transistor PD1 112 and the second N-channel pull-down transistor PD2 116 in the 6-transistor SRAM cell 100 in FIG. 1, after one or more data write operations having occurred on the cell. The SRAM cell in FIG. 1 has two pass-gate transistors, PG1 and PG2. However, in other embodiments, the SRAM cell may have more than two pass-gate transistors, such as an 8-transistor SRAM cell with four pass-gate transistors or a 10-transistor SRAM cell with six pass-gate transistors. In some embodiments, the transistors in the SRAM cell may be planar field effect transistors. In other embodiments, the transistors in the SRAM cell are FinFETs.

Flowchart 400 can be performed at least partially with a controller, such as the controller in FIG. 5. Other implementations may perform the steps in different orders and/or with different, fewer or additional steps than those illustrated in FIG. 4. Multiple actions can be combined in some implementations. For convenience, this flowchart is described with reference to the SRAM cell 100 in FIG. 1. The SRAM cell is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as an SRAM array with planar transistors, an SRAM array with FinFETs, etc.

FIG. 4 includes a process 400 that begins at step 402, where a low voltage is applied to the power supply line Vdd.

Process 400 continues at step 404 where a high voltage is applied to the word line WL.

At step 406, a low voltage is applied to the bit line BL and the complement bit line BLB.

At step 408, a low voltage is applied to the word line WL.

At step 410, a high voltage is applied to the reference line Vss.

At step 412, the voltages at the power supply line Vdd, the word line WL, the bit line BL, the complement bit line BLB and the reference line Vss are maintained for a period of time. In some embodiments, the period of time is at least 1 microsecond. In some embodiments, the period of time is in a range of 1 microsecond-300 seconds.

Integrated Circuit with an SRAM Array

FIG. 5 is a block diagram of an SRAM array and decoder/driver circuitry, which may be a standalone SRAM device or part of a larger integrated circuit device. It comprises an SRAM array 510, having word lines 512 (WL in FIG. 1) and bit lines 514 (BL and BLB in FIG. 1). The word lines 512 are connected to outputs of a row decoder 516, which receives a subset 518 of bits of the address input 520. The remainder 522 of the bits of the address input 520 are connected to a column decoder 524, which provides select lines to a column multiplexer 528. The demultiplexed lines of the column multiplexer 528 are the bit lines 514. For write operations, data is provided on lines 530 to a set of drivers 532, which provide outputs 534 for the column multiplexer 528 to drive the bit lines 514. For read operations, data from the SRAM cell array 510 on bit lines 514 passes through the column multiplexer 528 in the opposite direction, and via lines 536 to a sense amplifier 538. The sense amplifier provides output data on Data Out lines 540. In addition, read and write enable signals are provided to a controller 542 to enable reading or writing globally therein. The structure and operation of column multiplexer 529, row and column decoders 516 and 524, driver 532 and sense amplifier 538 are not significant to the invention, so a reader will know a variety of designs that can be used for these functions. They are not further described herein.

In addition, a reset enable signal may be provided to the controller 542 to enable charge detrapping in P-channel pull-up transistors, and N-channel pull-down transistors in a portion of the SRAM array 510. In some embodiments, the portion may be one SRAM cell. In some embodiments, the portion may be a row of SRAM cells in the SRAM array 510. In some embodiments, the portion may be the entire SRAM array 510.

In some embodiments, the transistors in the SRAM 510 array may be planar field effect transistors. In other embodiments, the transistors in the SRAM array 510 are Fin Field Effect Transistor transistors (FinFETs).

Figure 1:
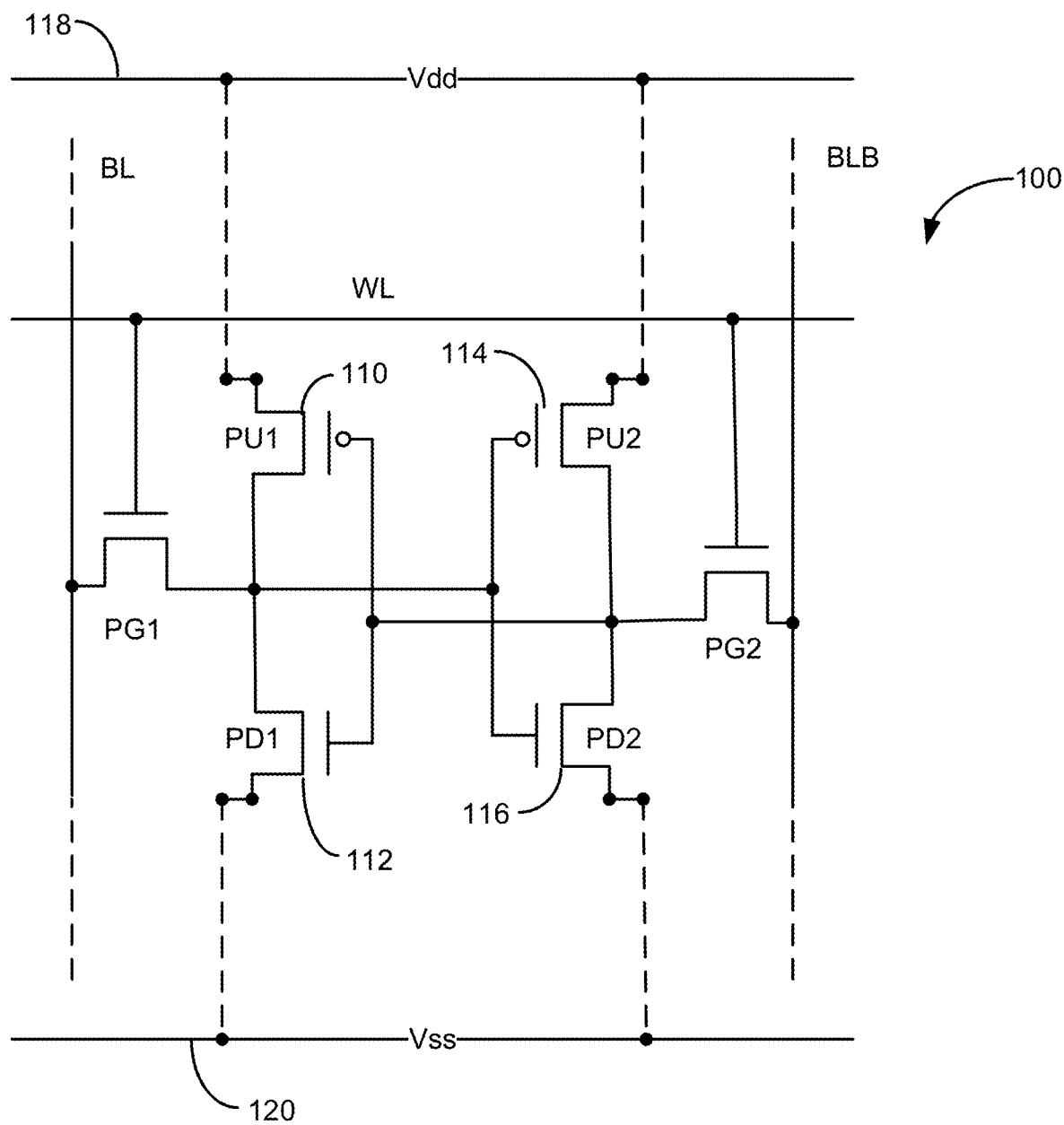
FIG. 1 is a circuit schematic of a typical 6-transistor SRAM cell.
Figure 2:
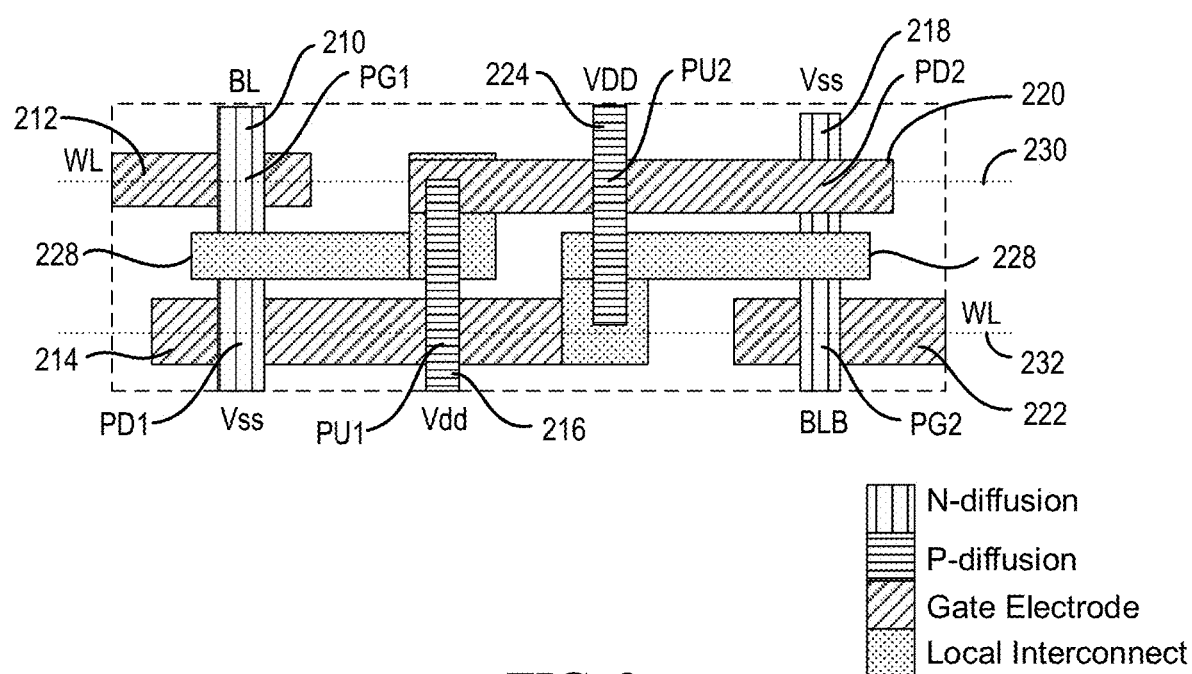
FIG. 2 is a plan view of a typical FinFET-based layout of the cell of FIG. 1.
Figure 6:
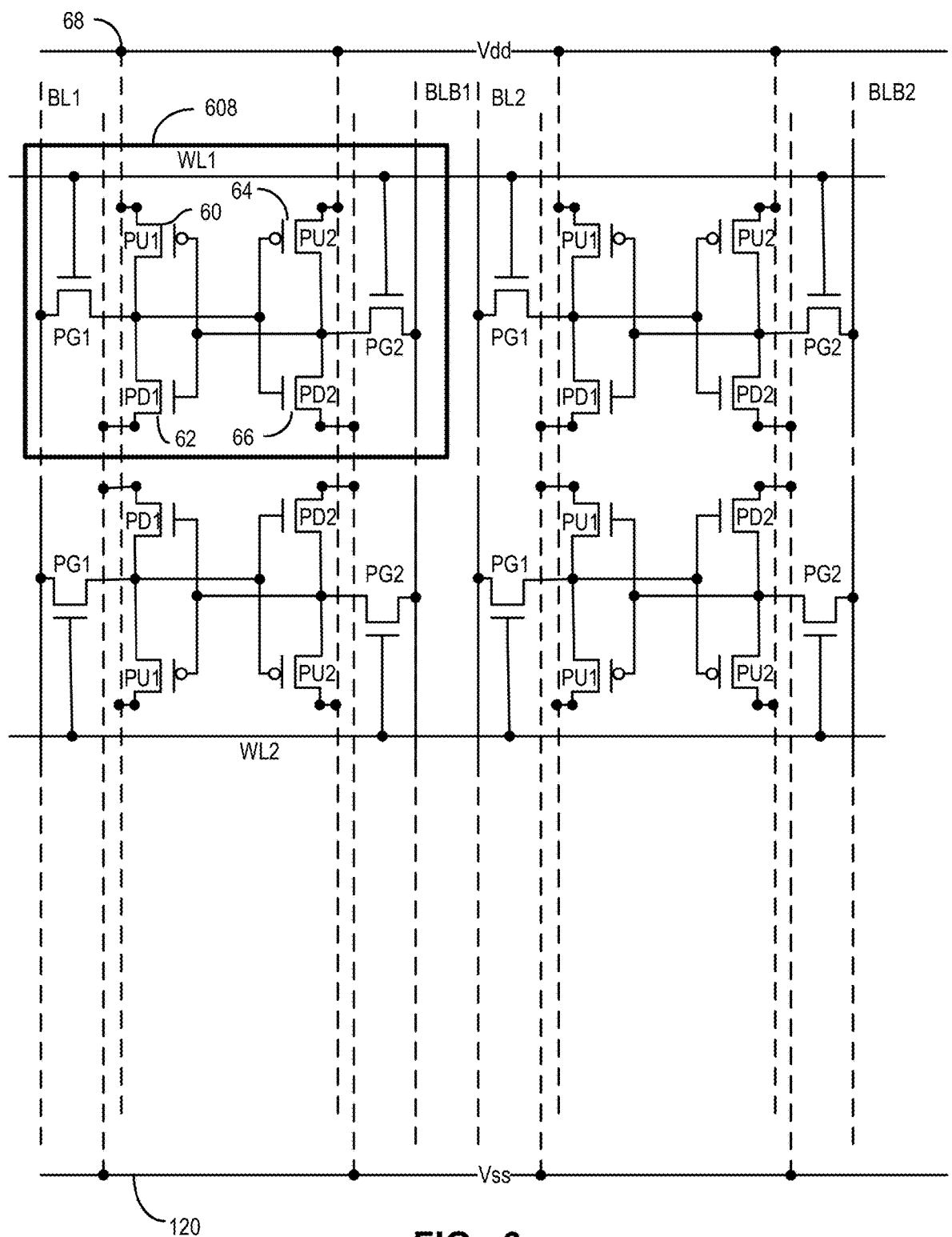
FIG. 6 is a circuit schematic of a portion of the array of FIG. 5, showing four of the cells of FIG. 1.

FIG. 6 is a circuit schematic of a portion of the SRAM array 510, showing four of the cells of FIG. 1. A heavy black line 608 has been added to identify the bounds of one of the cells. It can be seen that all the cells in each row share a word line WL, and all the cells in each column share a differential pair of bit lines BL/BLB. The reader will recognize that many other arrangements are possible and known for arranging SRAM cells into arrays. Additionally, an SRAM array typically will include a much larger number of cells than the four shown in FIG. 6.

Figure 7:
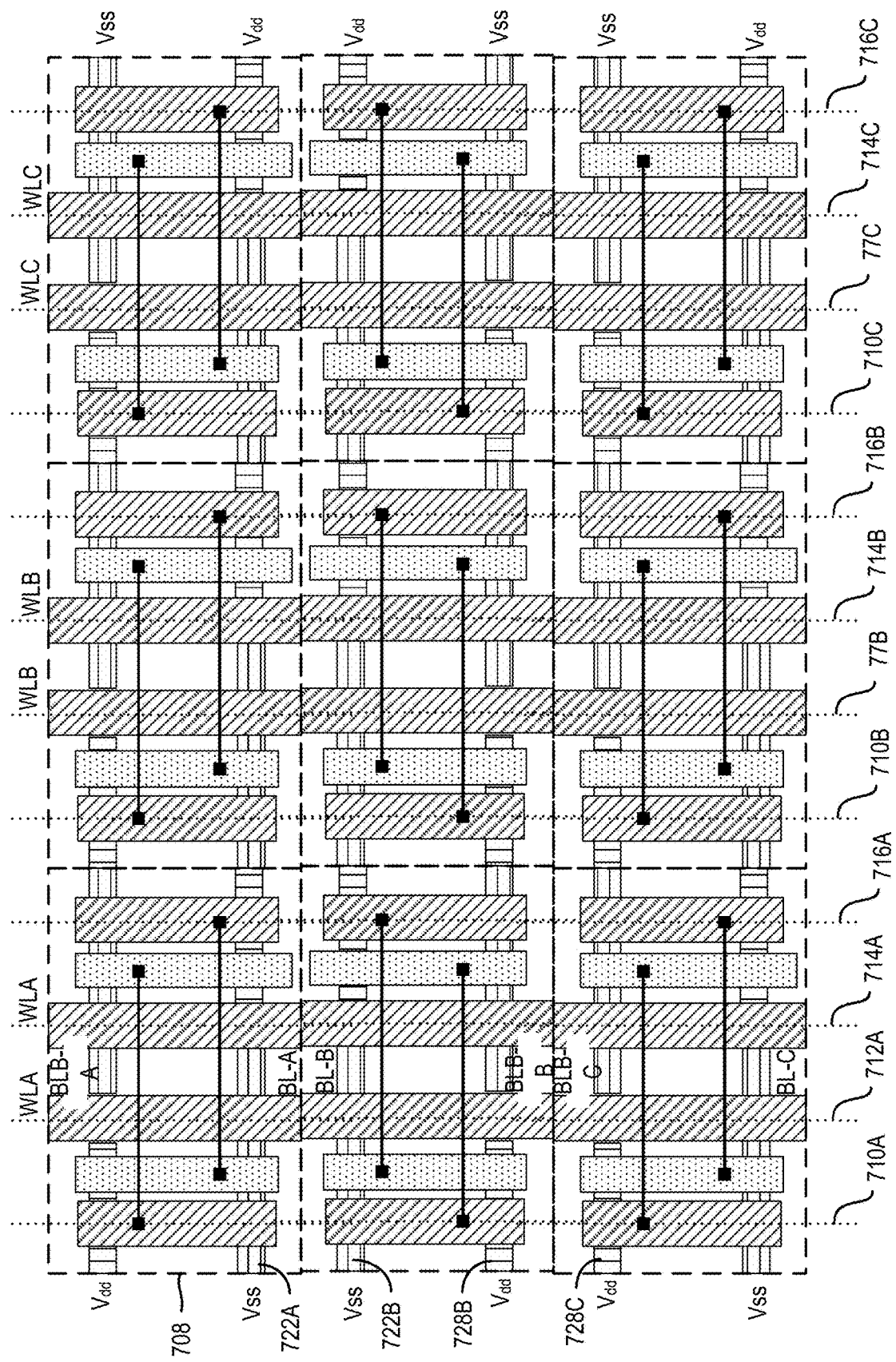
FIG. 7 is a schematic of an example layout of the array of FIG. 6.

FIG. 7 is a schematic of an example layout of the SRAM array 510 with FinFETs. It includes nine cells with FinFETs, with each cell bordered by a dashed line such as 708. The array forms a grid illustrated and described with respect to FIG. 7 as having horizontal rows and vertical columns. Horizontally, all cells are laid out the same. Vertically, adjacent cells alternate orientation, with the cells in the top and bottom row flipped top-to-bottom relative to the cells in the center row. This arrangement facilitates the formation of N- and P-wells. For example, the upper N-type fin 722B in the center row of cells can share a P-well with the lower N-type fin 722A in the upper row of cells, and the lower P-type fin 728B in the center row of cells can share an N-well with the upper P-type fin 728C in the lower row of cells in the drawing. It will be appreciated that the terms "horizontal" and "vertical" are used only as a convenience to mean first and second orthogonal directions generally parallel to the integrated circuit surface. Similarly, the designation of one direction as having "rows" and the other "columns" is arbitrary as well. Additionally, as used herein, the term "integrated circuit device" is unspecific as to the stage of device fabrication. For example, the wafer prior to application of any diffusions or circuitry is sometimes referred to herein as the device, as is the partially finished product at any stage of fabrication, and as is the finished product.

The array of FIG. 7 includes four gate electrode tracks 710, 712, 714 and 716 passing through each column of cells, and two diffusion tracks passing through each row of cells. (In the drawing, the suffix A is added to the designator for the tracks passing through the cells of the left-hand column, the suffix B is added to the designator for the tracks passing through the cells of the center column, and the suffix C is added to the designator for the tracks passing through the cells of the right-hand column. When the designator is used herein without the suffix, it refers to the corresponding track in any or all of the cell columns.) The channel regions of all the PD1 and PU1 transistors are defined by gate electrodes formed along track 710, and the channel regions of all the PU2 and PD2 transistors are defined by gate electrodes formed along track 716. The channel regions of all the PG1 transistors are defined by gate electrodes formed along track 712, and the channel regions of all the PG2 transistors are defined by gate electrodes formed along track 714. Connections to word lines WLA, WLB, and WLC (for the cells in the left-, center-, and right-hand columns, respectively) are indicated. Connections to the true bit lines BL-A, BL-B and BL-C (for the cells in the upper, center and lower rows, respectively) are indicated, as are connections to the complement bit lines BLB-A, BLB-B and BLB-C (for the cells in the upper, center and lower rows, respectively). For clarity of illustration, not all the connections in the array are indicated.

It can be seen that the word line gate electrodes in this example which define the channels of transistors PG1 and PG2 in any one cell column, do not share tracks with the gate electrodes which define the channels of transistors PU1, PD1, PU2 and PD2 in that cell column. Thus the layout designer can select a gate electrode width (and therefore channel length) for PG1 and PG2 in a particular cell column which differs from those for PU1, PD1, PU2 and PD2 in that cell column. Additionally, the gate electrode for PG1 also does not share a track with the gate electrode for PG2 in a particular column. Thus if desired, the layout designer can select different channel lengths for these two transistors as well. Still further, the gate electrode for transistors PD1 and PU1 in a particular column does not share a track with the gate electrode for transistors PU2 and PD2 in the same column, so if desired, the layout designer also can select different channel lengths for PD1 and PU1 relative to PD2 and PU2 in a particular column. Moreover, the gate electrodes for one column of cells do not share tracks with the gate electrodes for any of the other columns of cells, so if desired, the layout designer also can select different channel lengths for corresponding transistors in different columns of cells. In other words, the layout of FIG. 7 offers the layout designer significantly more flexibility to adjust the channel lengths of the various transistors in order to achieve device ratios which achieve a balance with optimal static noise margin and leakage. And again, if the fin and electrode widths remain the same, and there is no change in the chip area occupied by the array.

The array architecture of FIG. 7 is only one of many architectures that can benefit from aspects of the invention. Other architectures include folded architectures, cells in multiple planes, and so on. It will be appreciated that in certain array architectures, a single array of cells can also be thought of as more than one "sub-array" of cells, which as used herein, is itself also considered an "array" of cells.

EDA System/Workflow Explanation

Figure 8:
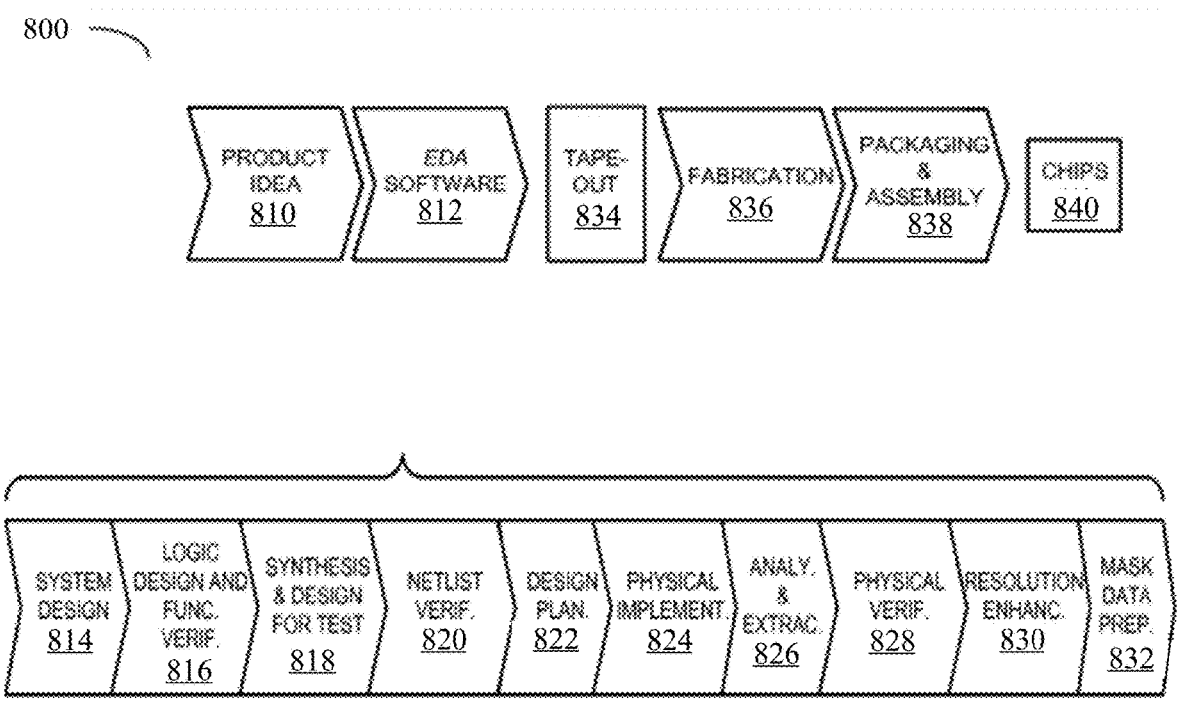
FIG. 8 depicts a flowchart of various operations in the design and fabrication of an integrated circuit in accordance with an embodiment of the present disclosure.

FIG. 8 illustrates various processes performed in the design, verification, and fabrication of an item of manufacture such as an integrated circuit using software tools with a computer, and possibly special hardware-assisted tools, to transform and verify design data and instructions that represent the integrated circuit. These processes start with the generation of a product idea 810 with information supplied by a designer, information which is transformed during a process to create an item of manufacture (referred to herein as a design or device) that uses an EDA software tool 812, which may also be signified herein as EDA software, as a design tool, or a verification tool. When the design is finalized, it can be taped-out 834, which typically is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed, which result in the finished integrated circuit 840 which may also be signified herein as a circuit, device, component, chip or SoC (System on Chip).

Items of manufacture, for example, a circuit or system are used in commerce at a variety of levels of abstraction ranging from low-level transistor layouts to high-level description languages. Most designers start at high-level of abstraction to design their circuits and systems, using a hardware description language (HDL) such as VHDL, Verilog, SystemVerilog, SystemC, MyHDL or OpenVera. The high-level HDL is easier for developers to comprehend, especially for a vast system, and may describe highly complex concepts that are difficult to grasp using a lower level of abstraction. The HDL description may be converted into other levels of abstraction as is helpful to the developers. For example, a high-level description may be converted to a logic-level register transfer level (RTL) description, a gate-level (GL) description, a layout-level description, or a mask-level description. Each lower abstraction level introduces more detail into the design description. The lower-levels of abstraction may be generated automatically by computer, derived from a design library, or created by another design automation technique. An example of a specification language at a lower level of abstraction is SPICE, much used detailed descriptions of analog-based circuits.

A design process that uses an EDA software tool 812 includes processes 814-832, which are described below. This design flow description is for illustration purposes only and is not meant to limit the present disclosure. For example, an actual integrated circuit design may require a designer to perform the design operations in a different sequence than the sequence described herein.

During system design 814, a designer describes the functionality to be manufactured. The designer can also perform what-if planning to refine the functionality and to check costs, etc. Hardware-software architecture partitioning can occur at this stage. Exemplary EDA software products from Synopsys, Inc. of Mountain View, Calif., that can be used at this stage include: Model Architect, Saber, System Studio, and Designware products.

During logic design and functional verification 816, modules in the circuit are specified in one or more hardware description languages, or HDLs, and the design in HDL is checked for functional accuracy, that is, to match the requirements of the specification of the circuit or system being designed to ensure that the design produces the correct outputs. Exemplary HDL languages are Verilog, VHDL, and SystemC. Functional verification is typically done by using software-based simulators and other tools such as testbench generators, static HDL checking tools, and formal verification tools. In some situations, special hardware referred to as 'emulators' or 'prototyping systems' are used to speed up the functional verification. Exemplary EDA software products from Synopsys, Inc. of Mountain View, Calif. that can be used at this stage include VCS, Vera, Designware, Magellan, Formality, ESP, and Leda products. Exemplary emulator and prototyping products also available from Synopsys that can be used at this state include: Zebu® and Protolink® (®="Registered Trademark").

During synthesis and design for test 818, HDL code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

During netlist verification 820, the netlist is checked for compliance with timing constraints and for correspondence with the HDL code. Exemplary EDA software products from Synopsys, Inc. of Mountain View, Calif. that can be used at this stage include: Formality, Primetime, and VCS products.

During design planning 822, an overall floor plan for the integrated circuit is constructed and analyzed for timing and top-level routing. Exemplary EDA software products from Synopsys, Inc. of Mountain View, Calif. that can be used at this stage include: Astro and IC Compiler products.

During layout implementation 824, the physical placement (positioning of circuit elements such as transistors or capacitors) and routing (connection of the same by a plurality of conductors) occurs, as can selection of library cells to perform specific logic functions. Exemplary EDA software products from Synopsys, Inc. of Mountain View, Calif. that can be used at this stage include: the Astro and IC Compiler products.

During analysis and extraction 826, the circuit function is verified at the layout level, which permits refinement of the layout design. Exemplary EDA software products from Synopsys, Inc. of Mountain View, Calif. that can be used at this stage include: Astrorail, Primerail, Primetime, and Star RC/XT products.

During physical verification 828, the layout design is checked to ensure correctness for manufacturing constraints such as DRC constraints, electrical constraints, lithographic constraints, and circuitry function matching the HDL design specification. Exemplary EDA software products from Synopsys, Inc. of Mountain View, Calif. that can be used at this stage include the Hercules product.

During resolution enhancement 830, geometric manipulations of the layout are performed to improve manufacturability of the design. Exemplary EDA software products from Synopsys, Inc. of Mountain View, Calif. that can be used at this stage include: Proteus products.

During tape-out, data is created to be used (after lithographic enhancements are applied if appropriate) for production of lithography masks. Example EDA software products from Synopsys, Inc., that can be used during tape-out include the IC Compiler and Custom Designer families of products.

During mask-data preparation 832, the 'tape-out' data is used to produce lithography masks that are used to produce finished integrated circuits. Exemplary EDA software products from Synopsys, Inc. of Mountain View, Calif. that can be used at this stage include the CATS family of products.

For all of the above mentioned integrated circuit design tools, similar tools from other EDA vendors, such as Cadence, Siemens, other corporate entities or various non-commercial tools from universities, or open source repositories, can be used as an alternative.

Embodiments of the present disclosure can be used during one or more of the above-described stages. Specifically, some embodiments of the present disclosure can be used in EDA software 812.

A storage subsystem is preferably used to store the programs and data structures that provide the functionality of some or all of the EDA tools described herein, and tools applied for the development of cells for the library and for physical and logical design using the library. These programs and data structures are generally executed by one or more processors in a manner known to those of ordinary skill in the art.

General Computer Explanation

FIGS. 9A, 9B, and 9C are simplified block diagrams of a computer system suitable for use with embodiments of the technology, as well as circuit design and circuit embodiments of the technology.

In FIG. 9A, computer system 910 typically includes at least one computer or processor 914 which communicates with a number of peripheral devices via bus subsystem 912. Typically, the computer can include, or the processor can be, any of a microprocessor, graphics processing unit, or digital signal processor, and their electronic processing equivalents, such as an Application Specific Integrated Circuit (ASIC) or Field Programmable Gate Array (FPGA). The terms 'processor' and 'computer' are further defined below. These peripheral devices may include a storage subsystem 924, comprising a memory subsystem 926 and a file storage subsystem 928, user interface input devices 922, user interface output devices 920, and a network interface subsystem 916. The input and output devices allow user interaction with computer system 910.

The computer system may be a server computer, a client computer, a workstation, a mainframe, a personal computer (PC), a tablet PC, a set-top box (STB), a personal digital assistant (PDA), a cellular telephone, a smartphone, a web appliance, a rack-mounted "blade", a kiosk, a television, a game station, a network router, switch or bridge, or any data processing machine capable of executing instructions 124 (sequential or otherwise) that specify actions to be taken by that machine.

The computer system typically includes an operating system, such as Microsoft's Windows, Sun Microsystems' Solaris, Apple Computer's MacOs, Linux or Unix. The computer system also typically can include a Basic Input/Output System (BIOS) and processor firmware. The operating system, BIOS, and firmware are used by the processor to control subsystems and interfaces connected to the processor. Typical processors compatible with these operating systems include the Pentium and Itanium from Intel, the Opteron and Athlon from Advanced Micro Devices, and the ARM processor from ARM Holdings.

Innovations, embodiments and/or examples of the claimed inventions are neither limited to conventional computer applications nor the programmable apparatus that run them. For example, the innovations, embodiments and/or examples of what is claimed can include an optical computer, quantum computer, analog computer, or the like. The computer system may be a multi-processor or multi-core system and may use or be implemented in a distributed or remote system. The term 'processor' here is used in the broadest sense to include a singular processor and multi-core or multi-processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions 124 to perform any one or more of the sets of instructions discussed herein. Due to the ever-changing nature of computers and networks, the description of computer system 910 depicted in FIG. 9A is intended only as one example for purposes of illustrating the preferred embodiments. Many other configurations of computer system 910 are possible having more or less components than the computer system depicted in FIG. 9A.

Network interface subsystem 916 provides an interface to outside networks, including an interface to communication network 918, and is coupled via communication network 918 to corresponding interface devices in other computer systems or machines. Communication network 918 may comprise many interconnected computer systems, machines and communication links. These communication links may be wireline links, optical links, wireless links, or any other devices for communication of information. Communication network 918 can be any suitable computer network, for example, a wide area network such as the Internet, and/or a local area network such as Ethernet. The communication network can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

User interface input devices 922 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into computer system 910 or onto communication network 918. User interface input devices typically allow a user to select objects, icons, text and the like that appear on some types of user interface output devices, for example, a display subsystem.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 910 to the user or to another machine or computer system.

Memory subsystem 926 typically includes a number of memories including a main random-access memory (RAM) 930 (or other volatile storage devices) for storage of instructions and data during program execution and a read-only memory (ROM) 932 in which fixed instructions are stored. File storage subsystem 928 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 928.

Bus subsystem 912 provides a device for letting the various components and subsystems of computer system 910 communicate with each other as intended. Although bus subsystem 912 is shown schematically as a single bus, alternative embodiments of the bus subsystem may use multiple busses. For example, RAM-based main memory can communicate directly with file storage systems using Direct Memory Access (DMA) systems.

FIG. 9B depicts a memory 940 such as a non-transitory, computer readable data, and information storage medium associated with file storage subsystem 928, and/or with network interface subsystem 916, and can include a data structure specifying a circuit design. The memory 940 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 9C signifies an integrated circuit 990 created with the described technology that includes one or more cells selected, for example, from a cell library.

Emulation Environment Explanation

Figure 10:
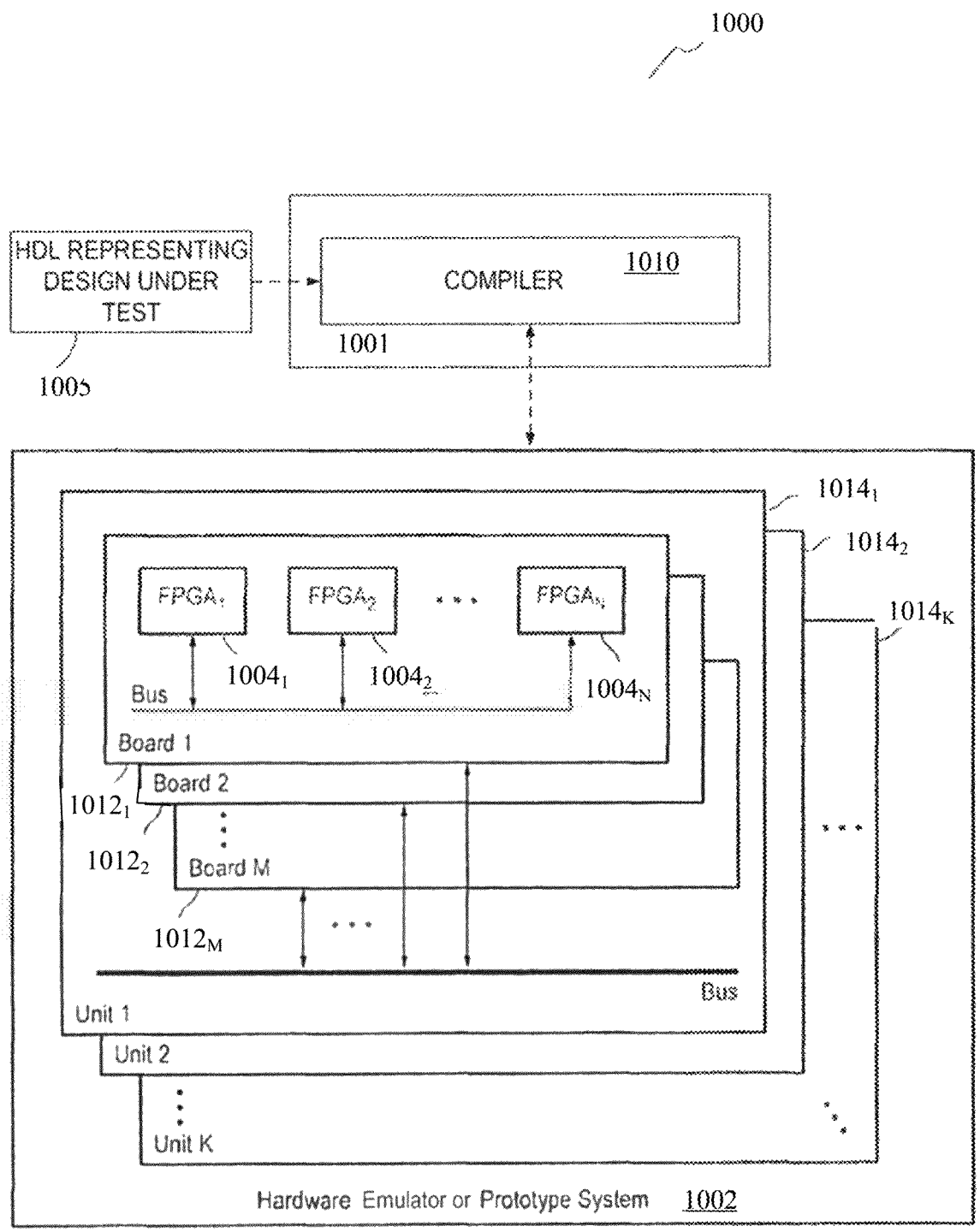
FIG. 10 depicts a block diagram of an emulation system.

An EDA software system, such as element 812 depicted in FIG. 8 typically includes an emulation system 816 to verify the functionality of the circuit design. FIG. 10 depicts a typical emulation system which includes a host computer system 1001 (often part of an EDA system) and an emulator system 1002 (typically a set of programmable devices such as Field Programmable Gate Arrays (FPGAs)). The host system generates data and information, typically using a compiler 1010, to configure the emulator to emulate a circuit design. One of more circuit designs to be emulated is referred to as a DUT (Design Under Test). The emulator is a hardware system that emulates a DUT, for example, to use the emulation results for verifying the functionality of the DUT. One example of an emulation system that can be used for the embodiments disclosed herein is the ZeBus Server available from Synopsys, Inc.

The host system 1001 comprises one or more processors. In the embodiment where the host system is comprised of multiple processors, the functions described herein as being performed by the host system may be distributed among the multiple processors.

The host system 1001 typically includes a compiler 1010 that processes code written in a hardware description language that represents a DUT, producing data (typically binary) and information that is used to configure the emulation system 1002 to emulate the DUT. The compiler 1010 may transform, change, reconfigure, add new functions to, and/or control the timing of the DUT.

The host system and emulator exchange data and information using signals carried by an emulation connection. The connection can be one or more electrical cables, for example, cables with pin configurations compatible with the RS232 or USB protocols. The connection can be a wired communication medium or network, such as a local area network, or a wide area network such as the Internet. The connection can be a wireless communication medium or a network with one or more points of access, using a wireless protocol such as Bluetooth® or IEEE 802.11. The host system and emulator can exchange data and information through a third device, such as a network server.

The emulator includes multiple FPGAs (or other programmable devices), for example, elements $1004_1$ to $1004_N$ in FIG. 10. Each FPGA can include one or more FPGA interfaces through which the FPGA is connected to other FPGAs of the emulator (and potentially other emulator hardware components), in order for the FPGAs to exchange signals. An FPGA interface may also be referred to as an input/output pin or an FPGA pad. While some embodiments disclosed herein make use of emulators comprising FPGAs, other embodiments can include other types of logic blocks instead of, or along with, the FPGAs for emulating DUTs, for example, custom FPGAs, specialized ASICs for emulation or prototyping, memories, and input/output devices.

A programmable device may include an array of programmable logic blocks and a hierarchy of reconfigurable interconnects that allow the programmable logic blocks to be connected to each other according to the descriptions in the HDL code. Each of the programmable logic blocks can be configured to perform complex combinational functions, or merely simple logic gates, such as AND, and XOR logic blocks.

In many FPGAs, logic blocks also include memory elements, which may be simple latches, flip-flops or more complex blocks of memory. Depending on the length of the interconnections between different logic blocks, signals may arrive at input terminals of the logic blocks at different times.

Programmable processors $1004_1$-$1004_N$ may be placed into one or more hardware boards $1012_1$ through $1012_M$. Many of such boards may be placed into a hardware unit, e.g., $1014_1$. The boards within a unit may be connected using the backplane of the unit or any other types of connections. In addition, multiple hardware units (e.g., $1014_1$ through $1014_K$) may be connected to each other by cables or any other means to form a multi-unit system. In general, the hardware emulation or prototype system 1002 may be formed using a single board, a single unit with multiple boards, or with multiple units without departing from the teachings of the present disclosure.

For a DUT that is to be emulated, the emulator receives from the host system one or more bit files including a description of the DUT. The bit files further specify partitions of the DUT created by the host system with trace and injection logic, mappings of the partitions to the FPGAs of the emulator, and design constraints. Based on the bit files, the emulator configures the FPGAs to perform the functions of the DUT. With some emulators, one or more FPGAs of an emulator already have the trace and injection logic built into the silicon of the FPGA. For this type of emulator, the FPGAs don't have to be configured by the host system to emulate trace and injection logic.

The host system 1001 receives (e.g., from a user) a description of a DUT that is to be emulated. In one embodiment, the DUT description is in a hardware description language (HDL), such as register transfer language (RTL). In another embodiment, the DUT description is in netlist level files, or a mix of netlist level files and HDL files. If part of the DUT description or the entire DUT description is in an HDL, the host system synthesizes the DUT description to create a gate level netlist based on the DUT description. A host system can use the netlist of the DUT to partition the DUT into multiple partitions, with some of these partitions including trace and injection logic. The trace and injection logic traces interface signals exchanged via the interfaces of an FPGA. Additionally, the trace and injection logic can be used to inject traced interface signals into the logic of the FPGA. The host system maps each partition to an FPGA of the emulator. With some emulators, the trace and injection logic is only included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic was incorporated, the bit files also describe the incorporation of the logic. The bit files may also include place and route information and design constraints. The host system stores the bit files and also stores for components of the DUT information describing which FPGAs are to emulate each component of the DUT (to which FPGAs each component is mapped).

Upon request, the host system transmits the bit files to the emulator. The host system instructs the emulator to emulate the DUT. During emulation of the DUT or at the end of the emulation, the host system receives emulation results from the emulator through the emulation connection. Emulation results are data and information generated by the emulator based on the emulation of the DUT. The emulation results include interface signals (states of interface signals) traced by the trace and injection logic of each FPGA. The host system can store the emulation results, or transmit them to another processing system.

After emulation of the DUT, a user may request to debug a component of the DUT. If such a request is made the user may provide a time period of the emulation to debug. The host system identifies which FPGAs are configured to emulate the component based on the stored information. The host system retrieves stored interface signals associated with the time period and traced by the trace and injection logic of each identified FPGA. The host system instructs the emulator to re-emulate the identified FPGAs, either one by one, multiple at a time, or all together. The host system transmits the retrieved interface signals to the emulator in order to re-emulate the component for the time period. The trace and injection logic of each identified FPGA injects its respective interface signals received from the host system into the logic of the DUT mapped to the FPGA. In case of multiple re-emulations of an FPGA, the results may be merged all together to have a full debug view.

The host system receives from the emulator signals traced by the logic of the identified FPGAs during the re-emulation of the component. The host system stores the signals received from the emulator. The signals traced during the re-emulation can have a higher sampling rate than during the initial emulation. For example, in the initial run, a traced signal may be comprised of a saved hardware state every X milliseconds. However, in the re-emulation the traced signal may be comprised of a saved hardware state every Y milliseconds, where Y is less than X. If the user requests to view a waveform of a signal traced during the re-emulation, the host system can retrieve the stored signal and display a plot of the signal (generates a waveform of the signal). Afterward, the user can, for example, request to re-emulate the same component but for a different time period or to re-emulate another component.

A host system typically comprises at least seven sub-systems: a design synthesizer, a mapping module, a run time module, a results module, a debug module, a waveform module, and a storage module. Each of these sub-systems may be embodied as hardware, software, firmware, or a combination thereof. Together these components configure the emulator, and monitor the emulation results.

The design synthesizer converts the HDL of a DUT into gate level logic. For a DUT that is to be emulated, the design synthesizer receives a description of the DUT. If the description of the DUT is fully or partially in HDL (e.g., RTL or other level of abstraction), the design synthesizer 1010 synthesizes the HDL of the DUT to create a gate-level netlist with a description of the DUT in terms of gate level logic.

The mapping module partitions DUTs and maps partitions to emulator FPGAs. The mapping module partitions a DUT at the gate level into a number of partitions using the netlist of the DUT. For each partition, the mapping module retrieves a gate level description of the trace and injection logic and incorporates the logic into the partition. As described above, the trace and injection logic included in a partition is configured to trace signals exchanged via the interfaces of an FPGA to which the partition is mapped (trace interface signals). The trace and injection logic can be incorporated into the DUT prior to the partitioning. For example, the trace and injection logic may be incorporated by the design synthesizer prior to or after the synthesizing the HDL of the DUT. Hence, the trace and injection logic may not match the partitions; it may be a subset, a superset or even different from the partitions.

In addition to including the trace and injection logic, the mapping module may include additional tracing logic in a partition in order to trace the states of certain DUT components that are not traced by the trace and injection logic (to trace signals other than the interface signals traced by the trace and injection logic). The mapping module may include the additional tracing logic in the DUT prior to the partitioning or in partitions after the partitioning. The design synthesizer can include the additional tracing logic in an HDL description of the DUT prior to synthesizing the description.

The mapping module maps each partition of the DUT to an FPGA of the emulator. The mapping module performs the partitioning and mapping using design rules, design constraints (e.g., timing or logic constraints), and information about the emulator. For components of the DUT, the mapping module stores information in the storage module describing which FPGAs are to emulate each component.

Based on the partitioning and the mapping, the mapping module generates one or more bit files that describe the created partitions and the mapping of logic to each FPGA of the emulator. The bit files may include additional information, such as constraints of the DUT, and routing information of connections between FPGAs and connections within each FPGA. The mapping module can generate a bit file for each partition of the DUT, which can be stored in the storage module. Upon request from a user, the mapping module transmits the bit files to the emulator, which the emulator uses to configure the FPGAs to emulate the DUT.

If the emulator includes specialized ASICs that include the trace and injection logic, the mapping module may generate a specific configuration allowing to connect them to the DUT or just save the information of what traced/injected signal is and where the information is stored on the specialized ASIC.

The run time module controls emulations performed on the emulator. The run time module may cause the emulator to start or stop executing an emulation. Additionally, the run time module may provide input signals/data to the emulator. The input signals may be provided directly to the emulator through the connection or indirectly through other input signal devices. For example, the host system with the run time module may control an input signal device to provide the input signals to the emulator. The input signal device may be, for example, a test board (directly or through cables), signal generator, another emulator, or another host system.

The results module processes emulation results generated by the emulator. During emulation and/or after completing the emulation, the results module receives emulation results from the emulator generated during the emulation. The emulation results include signals traced during the emulation. Specifically, the emulation results include interface signals traced by the trace and injection logic emulated by each FPGA. The emulation results may also include signals traced by additional logic included in the DUT. Each traced signal can span multiple cycles of the emulation. A traced signal is comprised of multiple hardware states, and each hardware state is associated with a time of the emulation. The results module stores the traced signals received in the storage module. For each stored signal, the results module can store information indicating which FPGA generated the traced signal.

The debug module allows users to debug DUT components. After the emulator has emulated a DUT and the results module has received the interface signals traced by the trace and injection logic during the emulation, a user may request to debug a component of the DUT by re-emulating the component for a specific time period. In a request to debug a component, the user identifies the component and indicates a time period of the emulation to debug. The user's request can also include a sampling rate that indicates how often hardware states should be saved by the logic that traces signals.

The debug module identifies the one or more FPGAs of the emulator that is configured to emulate the component based on the information stored by the mapping module in the storage module. For each identified FPGA, the debug module retrieves, from the storage module, interface signals traced by the trace and injection logic of the FPGA during the time period indicated by the user (i.e., retrieve hardware states traced by the trace and injection logic that are associated with the time period).

The debug module transmits the retrieved interface signals to the emulator. The debug module instructs the debug module to run the identified FPGAs and for the trace and injection logic of each identified FPGA to inject its respective traced signals into the logic of the FPGA in order to re-emulate the component for the requested time period. The debug module can also transmit the sampling rate provided by the user to the emulator so that the tracing logic traces hardware states at the proper intervals.

To debug the component, the emulator only has to run the FPGAs to which the component has been mapped. Additionally, the re-emulation of the component does not have to start from the beginning, but can start at any point desired by the user.

For an identified FPGA, the debug module can transmit instructions to the emulator to load multiple emulator FPGAs with the same configuration of the identified FPGA. The debug module additionally instructs the emulator to run the multiple FPGAs in parallel. Each FPGA from the multiple FPGAs is run with a different time window of the interface signals in order to generate a larger time window in a shorter amount of time. For example, for the identified FPGA to run a certain amount of cycles it may take an hour. However, if multiple FPGAs are loaded with the configuration of the identified FPGA, and each of the FPGAs runs a subset of the cycles, it may only take a few minutes for the FPGAs to collectively run all of the cycles.

A user may identify a hierarchy or a list of DUT signals to re-emulate. To enable this, the debug module determines the FPGA needed to emulate the hierarchy or list of signals, retrieves the necessary interface signals and transmits the retrieved interface signals to the emulator for re-emulation.

Hence, a user can identify any element (e.g., component or signal) of the DUT to debug/reemulate.

The waveform module generates waveforms based on traced signals. If a user requests to view a waveform of a signal traced during an emulation run, the host system retrieves the signal from the storage module. The waveform module displays a plot of the signal to the user. For one or more signals, when the signals are received from the emulator, the waveform module can automatically generate the plots of the signals.

Hardware/Software Equivalence

Some of the innovations, embodiments and/or examples described herein comprise and/or use a processor. As used herein, the term 'processor' signifies a tangible data and information processing device that physically transforms data and information, typically using sequence transformations (also referred to as 'operations'). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For data and information structured in binary form, any processor that can transform the data and information using the AND, OR and NOT logical operations (and their derivatives, such as the NAND, NOR, and XOR operations) can transform the data and information using any function of Boolean logic. A processor such as an analog neural network processor can also transform data and information non-digitally. There is no scientific evidence that any of these processors are processing, storing and retrieving data and information, in any manner or form equivalent to the bioelectric structure of the human brain.

The one or more processors may also operate to support the performance of the relevant operations in a 'cloud computing' environment or as a 'software as a service' (SaaS). For example, at least some of the operations may be performed by a group of processors available at a distributed or remote system, these processors accessible via a communications network (e.g., the Internet) and via one or more software interfaces (e.g., an application program interface (API).)

As used herein, the term 'module' signifies a tangible data and information processing device, that typically is limited in size and/or complexity. For example, the term 'module' can signify one or more methods or procedures that can transform data and information. The term 'module' can also signify a combination of one or more methods and procedures in a computer program. The term 'module' can also signify a small network of digital logic devices, in which interconnections of the logic devices give structure to the network. Methods and procedures comprising a module are specified in a specialized language, such as System C, can be used to generate a specification for a network of digital logic devices that process data and information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Intel's Altera), Random Access Memories (RAMs) or microprocessors. A module is configured to process data and information, typically using a sequence transformations (also referred to as 'operations') applied to the data and information (or in the case of ROMs and RAMS, transforming data and information by using the input information as an address for memory that stores output data and information), to perform aspects of the present innovations, embodiments and/or examples of the invention.

Modules that are temporarily configured need not be configured at any one instance in time. For example, a processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term 'algorithm' signifies a process comprising a sequence or set of operations or instructions that a module can use to transform data and information to achieve a result. A module can comprise one or more algorithms. As used herein, the term 'thread' refers to a sequence of instructions that can comprise a subset of the instructions of an entire process or algorithm. A process or algorithm can be partitioned into multiple threads that can be executed in parallel.

As used herein, the term 'computer' includes at least one information processor that, for example, can perform certain operations such as (but not limited to) the AND, OR and NOT logical operations using electronic gates that can comprise transistors, with the addition of memory (for example, memory based on flip-flops using the NOT-AND or NOT-OR operation). Such a processor is said to be Turing-complete or computationally universal. A computer, whether or not it is a digital computer, typically comprises many modules.

As used herein, the term 'software' or 'program' signifies one or more algorithms and data structures that configure a processor for use in the innovations, embodiments, and examples described in this specification. Such devices configurable by software include one or more computers, for example, standalone, client or server computers, or one or more hardware modules, or systems of one or more such computers or modules. As used herein, the term "software application" signifies a set of data and instructions that configure the processor to achieve a specific result, for example, to perform word processing operations, or to encrypt a set of data.

As used herein, the term 'programming language' signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object-oriented programming language such as Smalltalk, C++ or the like, and any future equivalent programming languages.

Software is entered into, equivalently, read into, one or memories of the computer or computer system from a data and information storage device. The computer typically has a device for reading storage media that is used to transport the software, or has an interface device that receives the software over a network. This process is discussed in the General Computer Explanation section.

Semantic Support

The signifier 'commercial solution' signifies, solely for the following paragraph, an engineering domain-specific (and thus non-preemptive—see Bilski) electronic structure, process for specified machines, manufacturable circuit (and their Church-Turing equivalents) or composition of matter that is useful in commerce to solve a problem of technology, that is, a use in commerce of an application of science or use in commerce of technology.

The signifier 'abstract' (when used in a patent claim for any embodiments disclosed herein for a new commercial solution that is a scientific application of one or more laws of nature {see Benson}, and that solves a problem of technology {see Diehr} used in commerce—or improves upon an existing commercial solution {see Diehr})—is precisely defined by the inventor(s) {see MPEP 2111.01} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is "difficult to understand" {see Merriam-Webster definition for 'abstract' } how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art items that can be combined {see Alice} by a person having ordinary skill in the art {a "PHOSITA", see MPEP 2141-2144} to be equivalent to the new commercial solution, and is thus unpatentable under 35 U.S.C. 103, for example, because it is "difficult to understand" how the new commercial solution differs from a PHOSITA-combination/-application of the existing prior art; or c) a new commercial solution is 'abstract' if it is not disclosed with an enabling description either because there is insufficient guidance in the enabling description, or because only a generic implementation is described {see Mayo} with unspecified elements, parameters or functionality, so that a PHOSITA is unable to instantiate a useful embodiment of the new commercial solution, without, for example, requiring special programming {see Katz} or circuit design to be performed by the PHOSITA), and is thus unpatentable under 35 U.S.C. 112, for example, because it is "difficult to understand" how to use in commerce any embodiment of the new commercial solution.

CONCLUSION

The foregoing Detailed Description signifies in isolation the individual features, structures, functions, or characteristics described herein and any combination of two or more such features, structures, functions or characteristics, to the extent that such features, structures, functions or characteristics or combinations thereof are based on the present specification as a whole in light of the knowledge of a person skilled in the art, irrespective of whether such features, structures, functions or characteristics, or combinations thereof, solve any problems disclosed herein, and without limitation to the scope of the claims. When an embodiment of a claimed invention comprises a particular feature, structure, function or characteristic, it is within the knowledge of a person skilled in the art to use such feature, structure, function, or characteristic in connection with other embodiments whether or not explicitly described, for example, as a substitute for another feature, structure, function or characteristic.

In view of the foregoing Detailed Description, it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein are chosen to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example, any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

What is claimed is:

1. A method for detrapping charges in gate dielectrics of P-channel pull-up transistors in a portion of a static random access memory (SRAM) array, the SRAM array comprising a plurality of SRAM cells arranged in rows and columns, each SRAM cell comprising a first inverter and a second inverter, each inverter comprising a P-channel pull-up transistor and a N-channel pull-down transistor having their drains connected together and their source/drain paths connected in series between a power supply line and a reference line, each SRAM cell further comprising a plurality of pass-gate transistors including a first pass-gate transistor and a second pass-gate transistor having gates connected to a word line, the first pass-gate transistor further having a source/drain path connected to the first inverter, a bit line and gates of the second inverter, and the second pass-gate transistor having a source/drain path connected to the second inverter, a complement bit line, and gates of the first inverter, the method comprising the steps of:
  (a) applying a positive power supply voltage to the power supply line;
  (b) applying a return voltage to the word line, the return voltage being lower than the positive power supply voltage;
  (c) applying a first voltage to the bit line and a second voltage to the complement bit line;
  (d) applying the positive power supply voltage to the word line;
  (e) lowering the voltage at the power supply line to the return voltage; and
  (f) maintaining the voltages at the power supply line, the word line, the bit line and the complement bit line for 1 microseconds-300 seconds.

2. The method of claim 1, wherein the first voltage is the return voltage and the second voltage is the positive power supply voltage.

3. The method of claim 1, wherein the first voltage is the positive power supply voltage and the second voltage is the return voltage.

4. The method of claim 1, wherein the steps (a) to (f) are performed sequentially.

5. The method of claim 1, wherein the steps (a) to (f) are performed with the first voltage being the return voltage and the second voltage being the positive power supply voltage; and
  the method further comprises repeating the steps (a) to (f) with the first voltage being the positive power supply voltage and the second voltage being the return voltage.

6. The method of claim 1, wherein lowering the voltage at the power supply line to the return voltage further comprises increasing the voltages at the gates of the first inverter higher than a voltage at the source of the P-channel pull-up transistor of the first inverter.

7. The method of claim 1, wherein lowering the voltage at the power supply line to the return voltage further comprises increasing the voltage at the gates of the second inverter higher than a voltage at the source of the P-channel pull-up transistor of the second inverter.

8. A method for detrapping charges in gate dielectrics of N-channel pull-down transistors in a portion of a static random access memory (SRAM) array, the SRAM array comprising a plurality of SRAM cells arranged in rows and columns, each SRAM cell comprising a first inverter and a second inverter, each inverter comprising a P-channel pull-up transistor and a N-channel pull-down transistor having their drains connected together and their source/drain paths connected in series between a power supply line and a reference line, each SRAM cell further comprising a plurality of pass-gate transistors including a first pass-gate transistor and a second pass-gate transistor having gates connected to a word line, the first pass-gate transistor further having a source/drain path connected to the first inverter, a bit line and gates of the second inverter, and the second pass-gate transistor having a source/drain path connected to the second inverter, a complement bit line, and gates of the first inverter, the method comprising the steps of:
  (a) applying a return voltage to the power supply line, the return voltage being lower than a positive power supply voltage;
  (b) applying the positive power supply voltage to the word line;
  (c) applying a first voltage to the bit line and a second voltage to the complement bit line;
  (d) applying the return voltage to the word line;
  (e) applying the positive power supply voltage to the reference line; and
  (f) maintaining the voltages at the power supply line, the word line, the bit line, the complement bit line and the reference line for 1 microsecond-300 seconds.

9. An integrated circuit device comprising:
  a static random access memory (SRAM) array, the SRAM array comprising a plurality of SRAM cells arranged in rows and columns, each SRAM cell comprising a first inverter and a second inverter, each inverter comprising a P-channel pull-up transistor and a N-channel pull-down transistor having their drains connected together and their source/drain paths connected in series between a power supply line and a reference line, each SRAM cell further comprising a plurality of pass-gate transistors including a first pass-gate transistor and a second pass-gate transistor having gates connected to a word line, the first pass-gate transistor further having a source/drain path connected to the first inverter, a bit line and gates of the second inverter, and the second pass-gate transistor having a source/drain path connected to the second inverter, a complement bit line, and gates of the first inverter; and
  decoder/driver circuitry including a controller which, in response to a trigger signal to detrap charges in gate dielectrics of P-channel pull-up transistors in a portion of the SRAM array:
    apply a positive power supply voltage to the power supply line;
    apply a return voltage to the word line, the return voltage being lower than the positive power supply voltage;
    apply a first voltage to the bit line and a second voltage to the complement bit line;
    apply the positive power supply voltage to the word line;
    lower the voltage at the power supply line to the return voltage; and
    maintain the voltages at the power supply line, the word line, the bit line and the complement bit line for 1 microsecond-300 seconds.

10. The integrated circuit device of claim 9, wherein the first voltage is the return voltage and the second voltage is the positive power supply voltage.

11. The integrated circuit device of claim 9, wherein the first voltage is the positive power supply voltage and the second voltage is the return voltage.

12. An integrated circuit device comprising:
  a static random access memory (SRAM) array, the SRAM array comprising a plurality of SRAM cells arranged in rows and columns, each SRAM cell comprising a first inverter and a second inverter, each inverter comprising a P-channel pull-up transistor and a N-channel pull-down transistor having their drains connected together and their source/drain paths connected in series between a power supply line and a reference line, each SRAM cell further comprising a plurality of pass-gate transistors including a first pass-gate transistor and a second pass-gate transistor having gates connected to a word line, the first pass-gate transistor further having a source/drain path connected to the first inverter, a bit line and gates of the second inverter, and the second pass-gate transistor having a source/drain path connected to the second inverter, a complement bit line, and gates of the first inverter; and decoder/driver circuitry including a controller which, in response to a trigger signal to detrap charges in gate dielectrics of N-channel pull-down transistors in a portion of the SRAM array, is configured to perform the steps of:
  (a) applying a return voltage to the power supply line, the return voltage being lower than a positive power supply voltage;
  (b) applying the positive power supply voltage to the word line;
  (c) applying a first voltage to the bit line and a second voltage to the complement bit line;
  (d) applying the return voltage to the word line;
  (e) applying the positive power supply voltage to the reference line; and
  (f) maintaining the voltages at the power supply line, the word line, the bit line, the complement bit line and the reference line for a first period of time.

13. The integrated circuit device of claim 12, wherein the first voltage is the return voltage and the second voltage is the positive power supply voltage.

14. The integrated circuit device of claim 12, wherein the first voltage is the positive power supply voltage and the second voltage is the return voltage.

15. The integrated circuit device of claim 12, wherein the steps (a) to (f) are performed sequentially.

16. The integrated circuit device of claim 12, wherein the steps (a) to (f) are performed with the first voltage being the return voltage and the second voltage being the positive power supply voltage; and
  the method further comprises repeating the steps (a) to (f) with the first voltage being the positive power supply voltage and the second voltage being the return voltage.

17. The method of claim 8, wherein the first voltage is the return voltage and the second voltage is the positive power supply voltage.

18. The method of claim 8, wherein the first voltage is the positive power supply voltage and the second voltage is the return voltage.

19. The method of claim 8, wherein the steps (a) to (f) are performed sequentially.

20. The method of claim 8, wherein the steps (a) to (f) are performed with the first voltage being the return voltage and the second voltage being the positive power supply voltage; and
  the method further comprises repeating the steps (a) to (f) with the first voltage being the positive power supply voltage and the second voltage being the return voltage.

* * * * *